E. C. HARDWICK.
AUTOMOBILE SIGNAL.
APPLICATION FILED APR. 29, 1916.
1,207,033.
Patented Dec. 5, 1916.
2 SHEETS—SHEET 1.
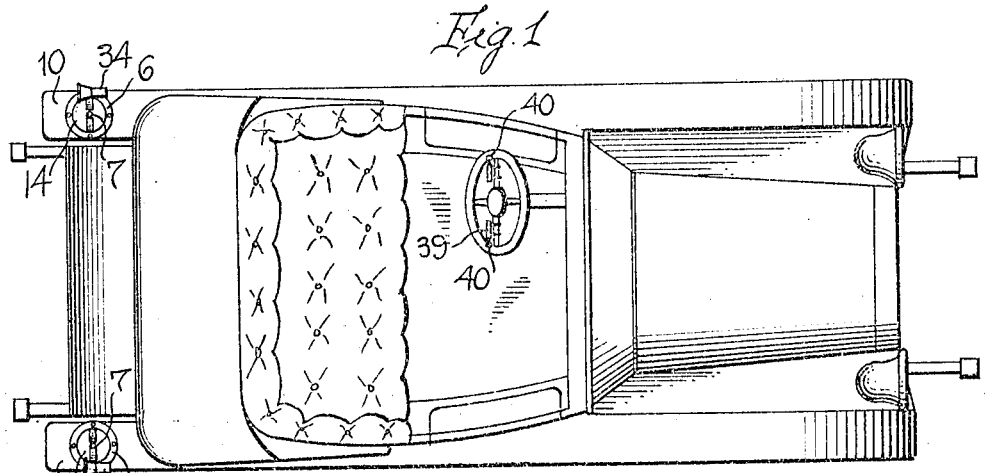
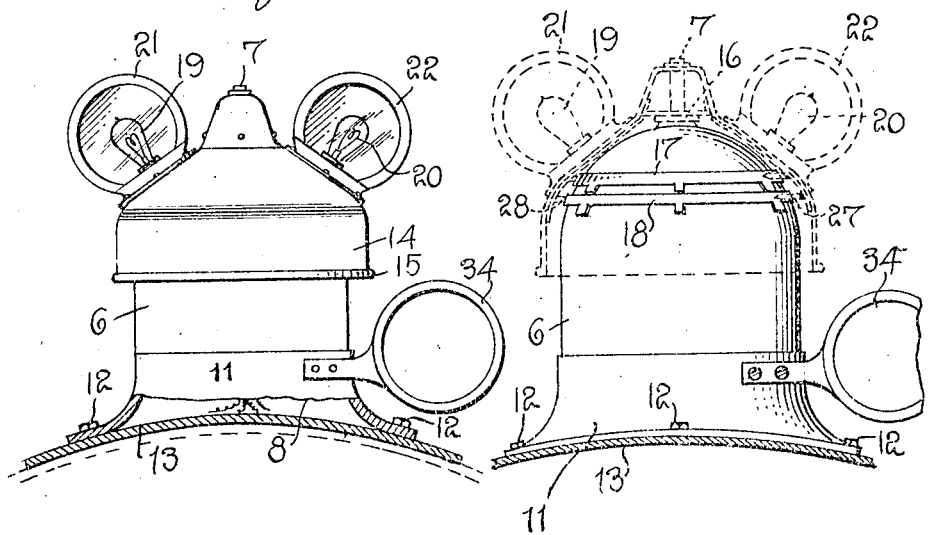
Inventor
E. C. HARDWICK
By Watson E. Coleman
Attorney E. C. HARDWICK.
AUTOMOBILE SIGNAL.
APPLICATION FILED APR. 29, 1916.
1,207,033.
Patented Dec. 5, 1916.
2 SHEETS—SHEET 2.
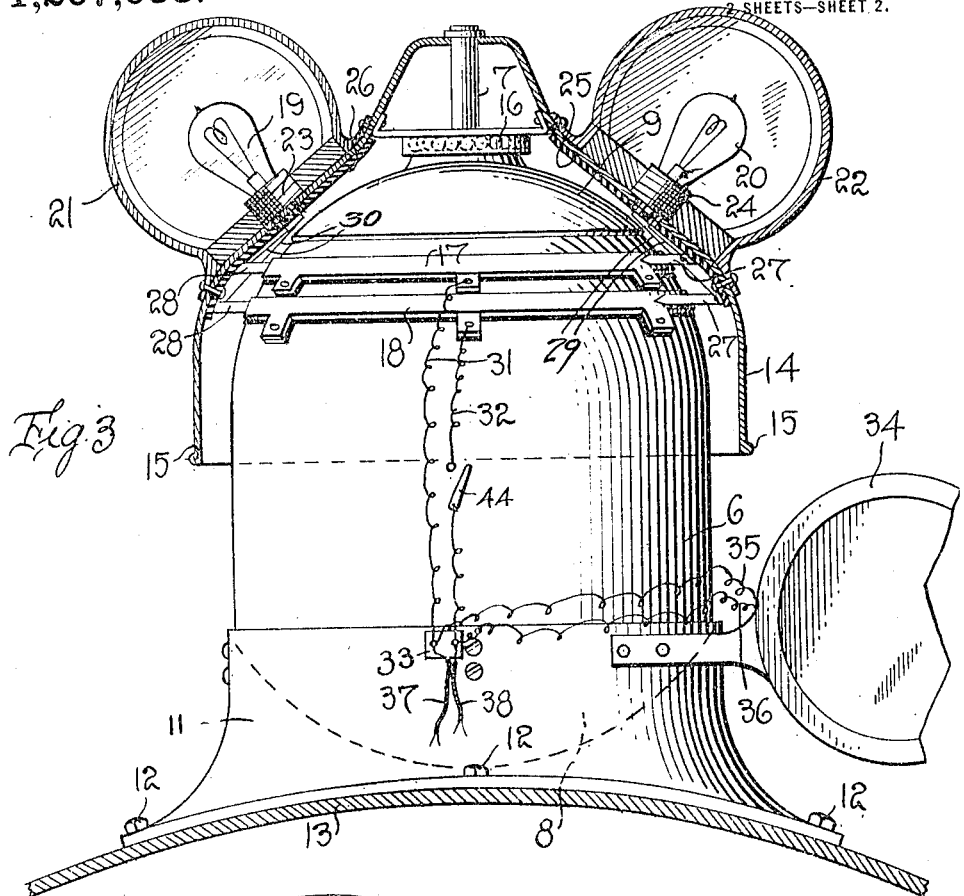
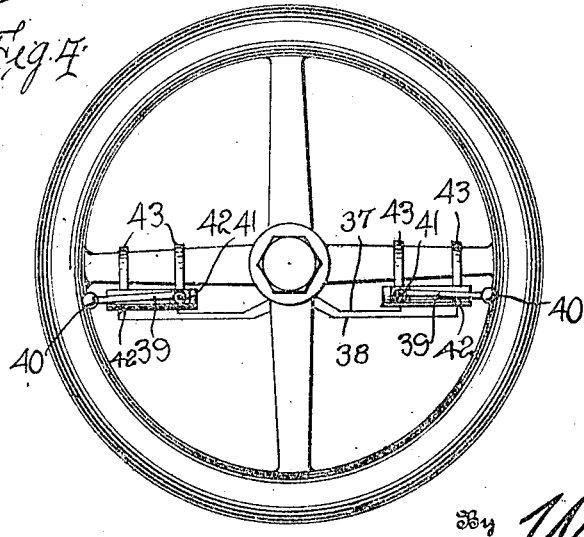
Inventor
E. C. HARDWICK
By Watson E. Coleman
Attorney

UNITED STATES PATENT OFFICE.

EUGENE CLAIR HARDWICK, OF GALENA, KANSAS.

AUTOMOBILE-SIGNAL.

1,207,033.    Specification of Letters Patent.    Patented Dec. 5, 1916.

Application filed April 29, 1916. Serial No. 94,477.

*To all whom it may concern:*

Be it known that I, EUGENE CLAIR HARDWICK, a citizen of the United States, residing at Galena, in the county of Cherokee and State of Kansas, have invented certain new and useful Improvements in Automobile-Signals, of which the following is a specification, reference being had to the accompanying drawings.

This invention is an automobile signal.

In most of the devices used for the purpose of giving a signal to a vehicle in the rear, no particular attempt is made to attract the attention of the driver of the rear vehicle. Most of these devices, as used, embody only a sign which at night, may be illuminated. These signs, of course, unless the driver happens to be watching the particular machine in front of him and knowing just where to look for that sign, will not attract attention. Oftentimes one of the machines ahead will turn off into a side street and will do it so quickly that unless the driver is constantly watching this forward machine, he may cause a collision.

In order to overcome the objections found in existing devices and to provide a better device, this invention has for one object to provide a signal that will be visual, as well as audible.

Another object is to provide a signal that will indicate to a vehicle in the rear, the turning direction.

A further object is to provide a signal operable by the driver of a vehicle to give two classes of signals simultaneously.

A still further object is to provide a signal that will consist of few parts simple in construction and one that will be little affected by atmospheric conditions.

A practical form of the invention is shown in the accompanying drawings, in which—

Figure 1 is a diagrammatic view of the signals positioned on a vehicle; Fig. 2 is a front elevation of the device mounted on a fender; Fig. 3 is a sectional view through the lamps; Fig. 4 is a side elevation of one type of switch that may be mounted on the spoke or spokes of the steering wheel; Fig. 5 is a phantom view of the motor and the cover.

This invention broadly stated comprises an electric motor and a source of electrical energy, a cover or bell carried by the shaft of the motor, electric contacts operable by the cover, light emitting elements mounted on the cover, an audible signal mechanism, electric circuits connecting the motor, the audible signal, and light emitting elements with the source of energy, and an opening and closing device for the circuit.

This device is intended to be mounted preferably upon the rear fenders of an automobile or other self-propelled vehicle. The motor may be of any usual form or type of construction that it is desired to use and preferably comprises a frame 6, an armature (not shown) and a shaft 7. This motor may be provided with suitable end plates or covers 8 and 9 and, thereby, convert this motor into what is known as an inclosed motor. This motor may be positioned upon the rear fender 10, in any suitable manner and one form of mounting is shown by means of the support 11, and retaining screws or bolts 12. In order to lessen the vibration, shock and jar, a rubber cushion 13 is interposed between the support and the fender and the motor may be secured to the support 11 in any suitable manner. The motor is preferably arranged so that this shaft is vertical. Mounted upon the upper portion of the shaft 7 is a cover 14. This cover may be of any preferred form or shape and is illustrated as being more or less of a hemispherical shape. This cover 14 extends downwardly and over the motor frame a sufficient distance and terminates in a rounded edge 15. This rounded edge 15, as well as the inner surfaces of the cover 14 are spaced from the frame and the upper end cover 9 a sufficient distance so that it will revolve freely.

In order to provide a suitable support for this cover 14, and also to maintain it in its spaced relation at all times, there may be provided the conventional ball bearings 16 shown upon the upper end of the motor and exterior of the end cover 9. This bearing is concentric with the shaft 7 of the motor and the cover 14 is extended inwardly a sufficient distance to raise and coöperate with this bearing.

Positioned near the upper end of the frame are two contact rings 17 and 18. These rings may be made of any suitable material such as copper and it is preferred to make them continuous so that each will form a circle, but spaced from each other.

Mounted at equi-distant points upon the cover are positioned two electric lamps 19 and 20 which are inclosed in a suitable manner by means of the covers 21 and 22. Disposed upon opposite sides of each of these covers 21 and 22 are various colored glasses, the colors of the glasses being similar upon each facing side, as for instance, when looking at the two lamps in one position, two red lights will show and when the cover is rotated one-half of a revolution, the lamps will show green.

The lamps 19 and 20 may be carried in suitable sockets indicated 23 and 24 in such a manner that they will be insulated from the cover 14. Positioned upon the inner face of the cover 14 and opposite to the lamp covers 21 and 22 and to coöperate with the lamp sockets 23 and 24 are suitable insulating plates 25 and 26. The insulating plate or block 25 may be secured to the cover 14 in any suitable manner. Mounted upon each of the plates 25 and 26, are contact fingers 27 for the plate 25, and 28 for the plate 26. These contact fingers may be secured to the insulating plate and are so positioned that they will contact with the contact rings 17 and 18. They may be made of any material of good electrical conductivity and may be adapted to press on the rings 17 and 18 through their own resiliency or by means of the resilient element coöperating therewith.

The lamps 19 and 20 and the fingers 27 and 28 are suitably interconnected by means of the conductors 29 and 30, respectively. The lamps are shown as being connected in multiple. To connect the rings 17 and 18 to the magneto or battery or other source of electric energy, suitable conducting wires 31 and 32 are provided that terminate in the terminal block 33. In order to prevent dust or other foreign substance from entering the space between the motor frame 6 and the cover 14, the cover or the frame may be provided with suitable dust excluding means (not shown), as is customary.

Suitably attached at some convenient point, is an audible signal mechanism 34 which may be of the usual or customary type, such as is employed upon automobiles or self-propelled vehicles. Suitable conducting wires 35 and 36 may be attached to the terminal block 33 and connected with the conductors 31 and 32 leading to the rings 17 and 18. From the terminal block 33 the conductors 37 and 38 run to the steering post for connection with the switch mechanism. This particular switch mechanism is illustrated in Fig. 4 and is shown as comprising a movable contact blade 39 and a handle 40 attached thereto. A plate 41 also carries a contact 42. The blade 39 is secured to this plate 41 in any suitable manner so that upon slight pressure it may contact with the contact 42 and thereby complete the circuit. This plate 41 is preferably made of some insulating material and is provided with suitable terminals so that the conductors 37 and 38 may lead to their proper contacts. The plate and its assembled parts is connected to one of the spokes of the steering wheel in some usual or customary manner. One form or means of attaching is shown by the yokes 43. The steering wheel is provided preferably with two of these circuit closing devices which are usually positioned upon a diameter of the wheel. This second switch mechanism connects with another suitable signal device disposed upon another fender and thus the driver of the machine is able to operate either one of the signal devices at will, to indicate to an on-coming vehicle, the direction that he will take. A horn or audible signal mechanism 34 will give the rear driver notice and attract attention and the revolving lights carried on the cover 14 will show the particular direction that will be taken, that is to say, if the lights turn on the right-hand rear fender, the direction to be taken will be that to the right, while if those disposed upon the left rear fender turn, the direction will be to the left. In order to introduce electric energy to this circuit from the steering post or wheel to the signal mechanism, it is thought that either one or the other of the line or conductors 37 or 38 should be cut and the two ends led to some suitable source of electric energy, such as the magneto or the lighting battery, (not shown).

During the day, when it is thought desirable not to have the lamps lighted upon the signal mechanism, a suitable switch 44 is provided to interrupt the circuit leading to the rings 17 and 18 and thence to the lamps 19 and 20. This will still leave the motor in an operative condition to rotate the signal lights by means of the cover 14 and also will permit of the horn 34 being used.

In practical operation, the person driving a vehicle upon which these signal devices are mounted, may desire to turn either to the right or to the left when leaving the main line of travel and in doing so, by pressing either one or the other of the switch mechanisms located upon the arms of the steering wheel, the respective signal mechanism located upon the rear fenders to indicate to an on-coming vehicle or driver such particular direction. The switch mechanism on the wheel closing circuit permits the current to traverse the conductors 37 and 38 leading to the switch block 33. This switch block 33 might also be termed a branch or distributing block, as from the terminals thereon conductors run both to the audible signal mechanism as well as to the contact rings 17 and 18 and thence by means of the fingers to the lamps disposed upon a rotatable cover 14. This terminal block 34 also carries or has connected to it in a suitable manner the leads for the motor, thus positioning all the various conductors and leads upon one block which makes it very convenient in case of injury or change of connections. When the circuit is closed and current is supplied to this terminal block, the horn or audible signal 34 is operated and gives forth a warning sound to attract attention in an oral manner. At the same time the motor operates, the armature and its shaft operate to revolve the cover 14 which carries the two signal lamps provided with the different colored glasses, such as red upon one facing side and green upon the other. When the attention has been attracted by means of the horn 34, the eyes naturally will seek the source of the sound whereupon the lights or colored glasses will be seen from which it may be determined the direction that the preceding driver will take.

Minor changes in form and details of construction may be resorted to without departing from the spirit of my invention or the scope of the appended claim.

What is claimed is:—

An automobile signal comprising a source of electric energy and circuits therefor, a vertically positioned electric motor, a substantially hemispherically-shaped cover secured to the shaft of the motor for rotation therewith and spaced from the frame of the motor, electric contacts mounted on the cover to coöperate with contacts carried on the frame, light emitting elements spaced on and carried by the cover, a base support for the motor, an audible signal mechanism mounted on the support, and means to connect and disconnect said motor, said lights, said audible signal to and from the source of energy through the circuits, so that the motor may be rotated, the lights lit and the audible signal mechanism operated to give warning to a vehicle.

In testimony whereof I hereunto affix my signature in the presence of two witnesses.

EUGENE CLAIR HARDWICK.

Witnesses:
 E. R. WHEELER,
 B. F. RUSSELL.